US012322384B1

(12) United States Patent
Ramachandran et al.

(10) Patent No.: US 12,322,384 B1
(45) Date of Patent: Jun. 3, 2025

(54) AUDIO TURN UNDERSTANDING SYSTEM

(71) Applicant: Character Technologies Inc., Palo Alto, CA (US)

(72) Inventors: Prajit Ramachandran, Santa Clara, CA (US); Yi Cui, Mountain View, CA (US)

(73) Assignee: Character Technologies Inc., Palo Alto, CA (US)

( * ) Notice: Subject to any disclaimer, the term of this patent is extended or adjusted under 35 U.S.C. 154(b) by 0 days.

(21) Appl. No.: 18/900,278

(22) Filed: Sep. 27, 2024

(51) Int. Cl.
*G10L 15/26* (2006.01)
*G10L 15/04* (2013.01)
*G10L 15/16* (2006.01)
*G10L 15/183* (2013.01)
*G10L 25/78* (2013.01)

(52) U.S. Cl.
CPC ............ *G10L 15/183* (2013.01); *G10L 15/04* (2013.01); *G10L 15/16* (2013.01); *G10L 25/78* (2013.01); *G10L 2025/783* (2013.01)

(58) Field of Classification Search
CPC ........ G06F 40/30; G06F 3/167; G06F 40/169; G10L 15/26; G10L 17/00; G10L 15/22; G10L 25/78; G10L 15/04; G10L 15/02; G10L 25/92; G10L 15/05; G10L 17/18; G10L 15/16; G10L 15/183; G10L 2025/783
See application file for complete search history.

(56) References Cited

U.S. PATENT DOCUMENTS

| | | | | |
|---|---|---|---|---|
| 5,598,507 A | * | 1/1997 | Kimber | G10L 15/07 704/250 |
| 5,606,643 A | * | 2/1997 | Balasubramanian | G10L 17/00 |
| 6,567,775 B1 | * | 5/2003 | Maali | G06V 20/40 704/231 |
| 6,697,564 B1 | * | 2/2004 | Toklu | H04N 21/8456 386/285 |
| 6,748,356 B1 | * | 6/2004 | Beigi | G10L 21/028 704/250 |
| 9,437,186 B1 | * | 9/2016 | Liu | G10L 15/05 |
| 10,148,818 B1 | * | 12/2018 | Koster | H04M 3/5231 |
| 11,632,456 B1 | * | 4/2023 | Mevorah | H04M 1/72454 455/420 |
| 11,640,823 B1 | * | 5/2023 | Pemberton | G10L 13/08 704/260 |
| 2007/0043565 A1 | * | 2/2007 | Aggarwal | G10L 15/063 704/245 |
| 2008/0103770 A1 | * | 5/2008 | Amini | H04M 3/2272 704/239 |
| 2012/0271634 A1 | * | 10/2012 | Lenke | G10L 25/78 704/E15.005 |
| 2013/0204622 A1 | * | 8/2013 | Lu | H04M 1/72484 704/251 |
| 2015/0310879 A1 | * | 10/2015 | Buchanan | G10L 17/06 704/235 |

(Continued)

*Primary Examiner* — Jakieda R Jackson
(74) *Attorney, Agent, or Firm* — Van Pelt, Yi & James LLP

(57) ABSTRACT

A real-time audio stream associated with a user is segmented into one or more chunks of audio. The one or more segmented chunks of audio are provided to an audio understanding model. It is determined that the user is finished with their turn in a conversation. In response to determining that the user has finished with their turn in the conversation, a response is provided based on the real-time audio stream.

20 Claims, 6 Drawing Sheets

(56) References Cited

U.S. PATENT DOCUMENTS

| | | | | |
|---|---|---|---|---|
| 2016/0342351 | A1* | 11/2016 | Li | G06F 3/0659 |
| 2018/0061412 | A1* | 3/2018 | Cho | G10L 17/00 |
| 2018/0190269 | A1* | 7/2018 | Lokeswarappa | G09B 19/06 |
| 2018/0232436 | A1* | 8/2018 | Elson | G06F 16/3344 |
| 2018/0293221 | A1* | 10/2018 | Finkelstein | G06N 20/00 |
| 2019/0163331 | A1* | 5/2019 | Epperlein | H04L 67/131 |
| 2020/0160845 | A1* | 5/2020 | Lavilla | G10L 15/005 |
| 2020/0335128 | A1* | 10/2020 | Sheeder | G10L 15/04 |
| 2020/0342868 | A1* | 10/2020 | Lou | G10L 15/22 |
| 2021/0035554 | A1* | 2/2021 | Iwase | G10L 15/04 |
| 2021/0065705 | A1* | 3/2021 | Ham | G10L 15/1815 |
| 2022/0084509 | A1* | 3/2022 | Sivaraman | G06N 3/045 |
| 2022/0115020 | A1* | 4/2022 | Bradley | G06F 3/0334 |
| 2022/0224735 | A1* | 7/2022 | Tokuchi | H04L 65/403 |
| 2022/0238118 | A1* | 7/2022 | Mazzoccoli | G06F 3/165 |
| 2022/0343914 | A1* | 10/2022 | Bonser | G10L 15/02 |
| 2023/0385323 | A1* | 11/2023 | Agarwal | G06F 16/34 |
| 2023/0394244 | A1* | 12/2023 | Vepa | G06F 40/35 |
| 2024/0005085 | A1* | 1/2024 | Kukde | G10L 25/78 |
| 2024/0107104 | A1* | 3/2024 | Loh | H04L 65/65 |
| 2024/0265269 | A1* | 8/2024 | Chen | G06N 3/0895 |
| 2024/0312466 | A1* | 9/2024 | Reouveni | G10L 17/14 |
| 2024/0347058 | A1* | 10/2024 | Rossi | G10L 13/08 |
| 2024/0347064 | A1* | 10/2024 | Li | G10L 15/28 |
| 2024/0354493 | A1* | 10/2024 | Nakajima | G06F 40/169 |
| 2024/0363099 | A1* | 10/2024 | Altaf | G10L 15/02 |

* cited by examiner

AUDIO TURN UNDERSTANDING SYSTEM

BACKGROUND OF THE INVENTION

People are engaging in conversations with artificial intelligence (AI) systems. The success of these systems in mimicking human-to-human interactions relies on their ability to recognize when a person has finished speaking. If the AI mistakenly thinks the person has finished and interrupts, it can cause frustration, making the user less inclined to continue using the system. Conversely, if the AI waits too long to respond after the person has finished speaking, it can also frustrate the user, as the system may seem too robotic.

BRIEF DESCRIPTION OF THE DRA WINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Systems and methods to understand audio turns in a human-to-AI conversation are disclosed herein. The systems and methods disclosed herein may be deployed where a human is having a voice conversation with an AI chatbot, such as a customer service environment, a call center environment, a gaming environment, a healthcare environment, an educational environment, a retail environment, a business environment, etc. The systems and methods disclosed herein reduce the latency associated with an AI system providing a response in a voice conversation. The systems and methods disclosed herein also reduce the likelihood of the AI system interrupting the system. As a result, users are more likely to return to the AI chatbot in the future because the interaction feels as natural to a human-to-human conversation.

Figure 1:
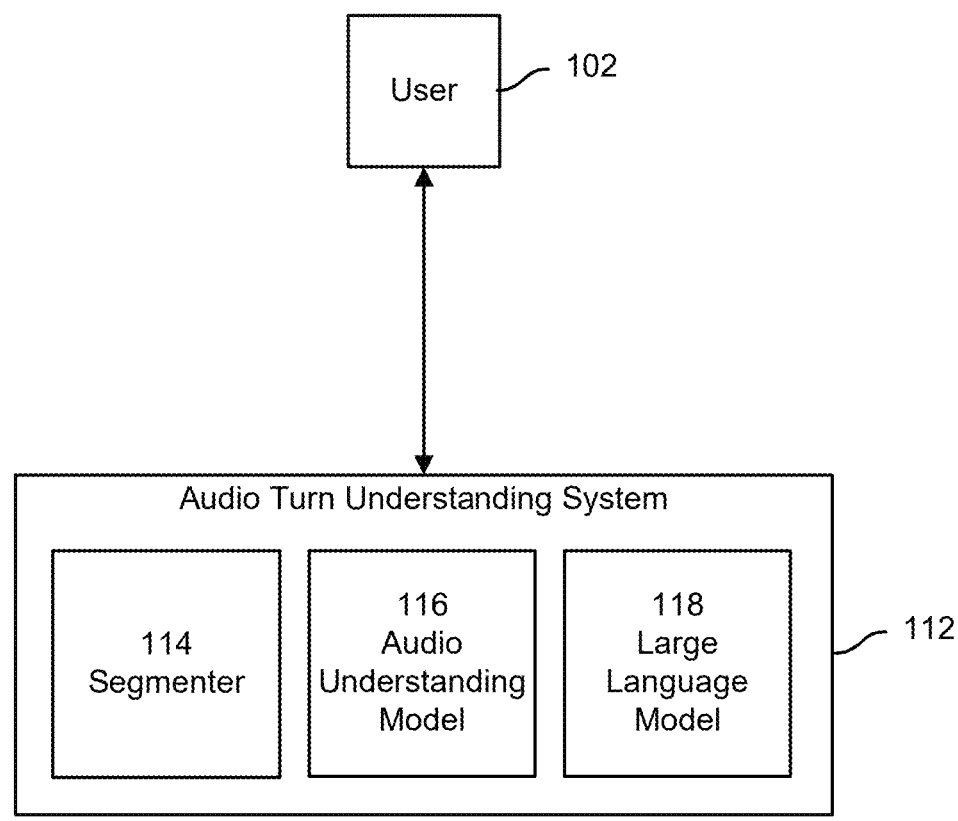
FIG. 1 is a block diagram illustrating an audio turn understanding system in accordance with some embodiments.

FIG. 1 is a block diagram illustrating an audio turn understanding system in accordance with some embodiments. In the example shown, system 100 includes user 102 and audio turn understanding system 112. In some embodiments, user 102 is a human. In some embodiments, user 102 is a client device associated with a human. For example, the client device may be computer, a server, a smartphone, a laptop, a tablet, a smartwatch, or any other electronic device capable of recording and/or streaming an audio signal associated with a human and providing the audio signal to audio turn understanding system 112.

During a conversation with user 102, audio turn understanding system 112 is configured to receive a stream of audio in real-time from user 102. Audio turn understanding system 112 includes segmenter 114, which is configured to segment the stream of audio into one or more chunks. A chunk may be extracted from the stream of audio when there is a silence threshold of audio (e.g., 200 ms) in the stream of audio. The silence threshold of audio may be pre-configured. In some embodiments, the silent threshold of audio is the same for all users (e.g., 200 ms for each user). In some embodiments, the silence threshold of audio is based on a user's speech pattern, that is the silence threshold of audio for a first user is different than the silent threshold of audio for a second user.

Segmenter 114 is configured to provide the one or more chunks to audio understanding model 116. In some embodiments, audio understanding model 116 is configured to transcribe the words included in the one or more chunks into written text (i.e., what was said in the stream of audio). In some embodiments, audio understanding model 116 is configured to generate audio embeddings that represent the audio included in the one or more chunks.

Audio understanding model 116 is trained using diarized data. This enables audio understanding model 116 to determine whether a user has finished their turn in a conversation or whether the user is still speaking. Diariazed data is data that answers the question of "Who spoke when?" The diarized data used to train audio understanding model 116 includes instances of non-overlapping speech and instances of overlapping speech.

Audio understanding model 116 is configured to annotate the written text by adding emotional context (e.g., "angry," "sad," "laughing," etc.). Audio understanding model 116 is configured to annotate the written text by adding pace context (e.g., "fast," "slow," "slurred," etc.).

Audio understanding model 116 is a machine learning model. In some embodiments, audio understanding model 116 is a neural network. The neural network may be supervised neural network, an unsupervised neural network, or a semi-supervised neural network. In some embodiments, other types of machine learning techniques are implemented, such as decision trees and random forests, support vector machines, gradient boosting machines, k-nearest neighbors, etc.

Audio understanding model 116 is configured to output a confidence level that indicates whether a user has finished their turn in a conversation. In response to the confidence level being greater than or equal to a confidence threshold, audio understanding model 116 is configured to wait for a buffer period (e.g., 400 ms). The buffer period aims to ensure the user has truly finished their turn without being so long as it causes unnecessary waiting. In some embodiments, in response to the buffer period expiring, audio understanding model 116 is configured to provide the transcription of the one or more chunks to large language model 118. In some embodiments, one or more annotations are provided in addition to the transcription of the one or more chunks. In some embodiments, in response to the buffer period expiring, audio understanding model 116 is configured to provide an audio embedding to large language model 118.

Large language model 118 is configured to generate a response based on the words spoken in the one or more chunks. In some embodiments, large language model 118 is a public large language model. In some embodiments, large language model 118 is a private large language model. In some embodiments, large language model 118 is a hybrid large language mode. In response to large language model 118 generating the response, audio turn understanding system 112 is configured to provide the large language response to user 102.

Figure 2:
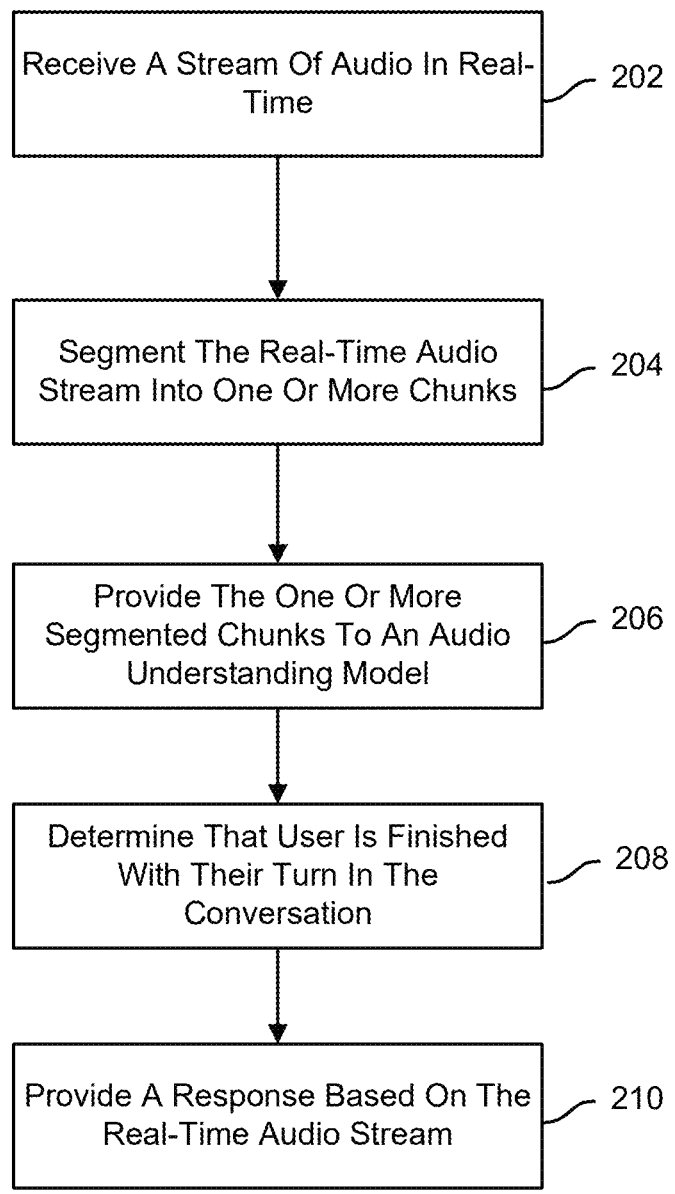
FIG. 2 is a flow diagram illustrating a process of understanding audio turns in accordance with some embodiments.

FIG. 2 is a flow diagram illustrating a process of understanding audio turns in accordance with some embodiments. Process 200 may be implemented by an audio turn understanding system, such as audio turn understanding system 112.

At 202, a stream of audio is received in real-time from a user. In some embodiments, the user is a person. In some embodiments, the user is a client device associated with a person. The stream of audio may be received by a microphone or as an electronic file.

At 204, the real-time audio stream is segmented into one or more chunks of audio. When a user is speaking in a conversation, they may pause for a brief period of time (e.g., 200 ms) to collect their thoughts, to breath, to emphasize what was previously said, etc. However, the user may not be finished with their turn in the conversation. In response to a determination that the amount of time that the user is not speaking is greater than or equal to a silence threshold, a chunk of audio is extracted from the real-time audio stream.

At 206, the one or more segmented chunks of audio are provided to an audio understanding model. The audio understanding model generates a representation of what was said in the one or more segmented chunks of audio. In some embodiments, the audio understanding model transcribes the spoken words in the one or more segmented chunks of audio into written text.

In some embodiments, the audio understanding model generates audio embeddings corresponding to the one or more segmented chunks of audio. An audio embedding corresponding to a segmented chunk of audio is a numerical representation of the audio data that captures the important features or characteristics of the audio in a lower-dimensional space. The audio embedding is generated by preprocessing the raw audio signals into features, such as mel-spectrograms or Mel-frequency cepstral coefficients (MFCCs), which are more manageable representations of sounds. The pre-processed signals are provided to a neural network (e.g., convolutional neural network or recurrent neural network) trained to learn a meaning representation of features in the form of an embedding. The output of the neural network is a fixed-length vector that encapsulates the most important aspects of the audio.

Based on the one or more segmented chunks of audio, the audio understanding model outputs a confidence score indicating whether the user has finished their turn. The audio understanding model is trained using diarized data. This enables the audio understanding model to determine whether a user has finished their turn in a conversation or whether the user is still speaking. Diariazed data is data that answers the question of "Who spoke when?" The diarized data used to train audio understanding model includes instances of non-overlapping speech and instances of overlapping speech.

At 208, it is determined that the user has finished their turn. The audio understanding model has outputted a confidence score that is greater than or equal to a confidence score threshold. This indicates that the user is likely finished their turn. However, the audio understanding model waits a buffer period (e.g., 400 ms) before providing the representation of what was said in the one or more segmented chunks of audio to a large language model. There is an associated cost with prompting the large language model to generate a response based on representation of what was said in the one or more segmented chunks of audio (e.g., provided response charged based on the number of tokens included in the prompt). To reduce expenses, a buffer period may be added to prevent the incurrence of unnecessary costs from large language model prompts.

At 210, a response based on the real-time audio stream is provided. In response to the buffer period lapsing, the representation of what was said in the one or more segmented chunks of audio is provided to a large language model. In response, the large language model generates a response. The large language model response is provided to the user. In some embodiments, the large language model response is provided as an audio response. In some embodiments, the large language model response is provided as a text response. In some embodiments, the large language model response is provided as a video response.

Process 200 enhances the likelihood that a user will continue interacting with the AI system by reducing the chances of interrupting the user before they finish speaking and ensuring that the response time does not make the AI seem overly robotic.

If the AI mistakenly thinks the person has finished and interrupts, it can cause frustration, making the user less inclined to continue using the system. Conversely, if the AI waits too long to respond after the person has finished speaking, it can also frustrate the user, as the system may seem too robotic.

Figure 3:
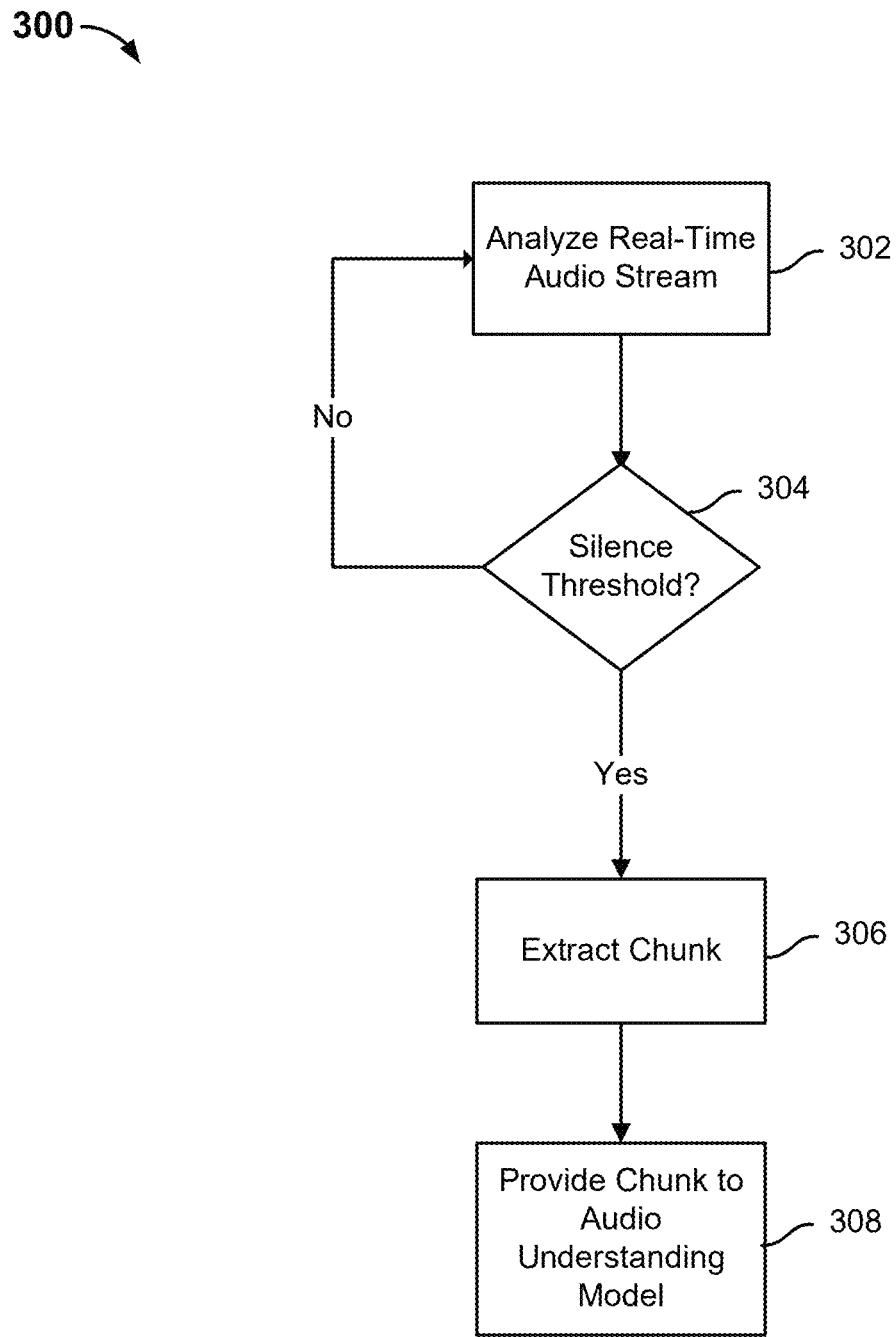
FIG. 3 is a flow diagram illustrating a process to segment an audio stream into one or more chunks.

FIG. 3 is a flow diagram illustrating a process to segment an audio stream into one or more chunks. In the example shown, process 300 may be implemented by an audio turn understanding system, such as audio turn understanding system 112. In some embodiments, process 300 is implemented to perform some or all of step 204 of process 200.

At 302, a real-time audio stream is analyzed.

At 304, it is determined whether there is a silence portion of the audio stream is greater than a silence threshold. When a user is speaking in a conversation, they may pause for a brief period of time (e.g., 200 ms) to collect their thoughts, to breath, to emphasize what was previously said, etc.

In response to a determination that the silence portion of the audio stream is greater than the silence threshold, process 300 proceeds to 306. In response to a determination that the silence portion of the audio stream is not greater than the silence threshold, process 300 returns to 302.

At 306, a chunk is extracted from the audio stream. The extracted chunk includes one or more words spoken by a user in the real-time audio stream.

At 308, the chunk is provided to an audio understanding model. The audio understanding model generates a representation of what was said in the extracted chunk and determines based on the words spoken in the extracted chunk, whether the user has finished their turn in the conversation.

Figure 4:
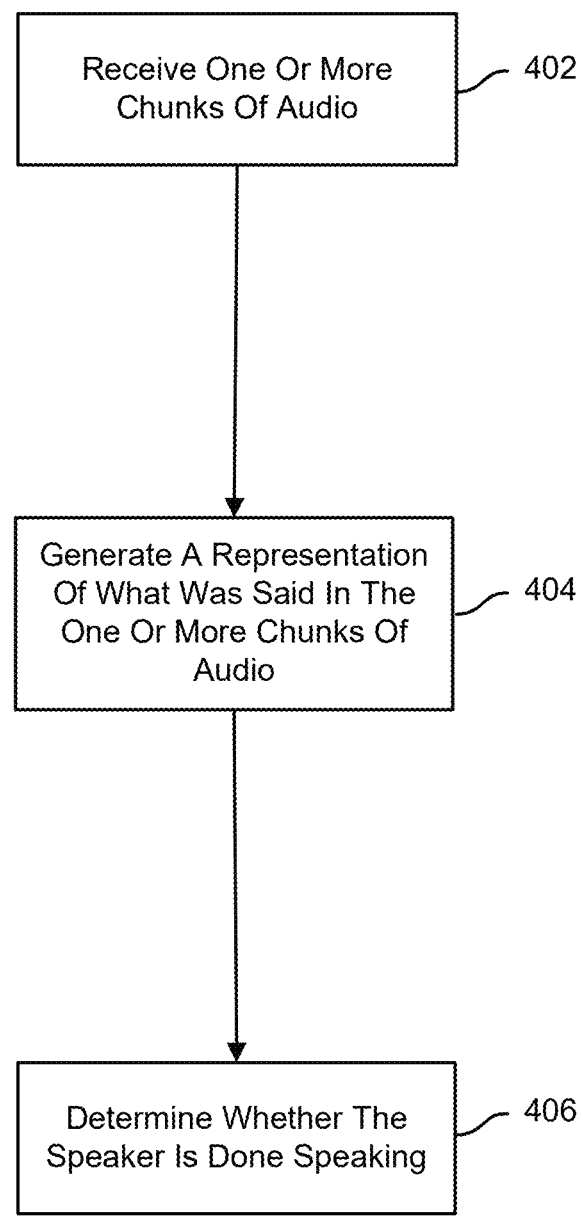
FIG. 4 is a flow diagram illustrating a process to determine that a speaker has finished speaking in accordance with some embodiments.

FIG. 4 is a flow diagram illustrating a process to determine that a speaker has finished speaking in accordance with some embodiments. In the example shown, process 400 may be implemented by an audio turn understanding system, such as audio turn understanding system 112. In some embodiments, process 400 is implemented to perform some or all of step 208 of process 200.

At 402, one or more chunks of audio are received.

At 404, a representation of what was said in the one or more chunks of audio is generated. In some embodiments, an audio understanding model transcribes the spoken words in the one or more chunks of audio into written text. In some embodiments, the audio understanding model generates audio embeddings corresponding to the one or more chunks of audio. An audio embedding corresponding to a segmented chunk of audio is a numerical representation of the audio data that captures the important features or characteristics of the audio in a lower-dimensional space.

At 406, it is determined whether the speaker is done speaking based on the one or more transcribed chunks of audio. Based on the representation of what was said in the one or more chunks of audio, the audio understanding model outputs a confidence score indicating whether the user has finished their turn. The audio understanding model is trained using diarized data. This enables the audio understanding model to determine whether a user has finished their turn in a conversation or whether the user is still speaking. Diarized data is data that answers the question of "Who spoke when?" The diarized data used to train audio understanding model includes instances of non-overlapping speech and instances of overlapping speech.

Figure 5:
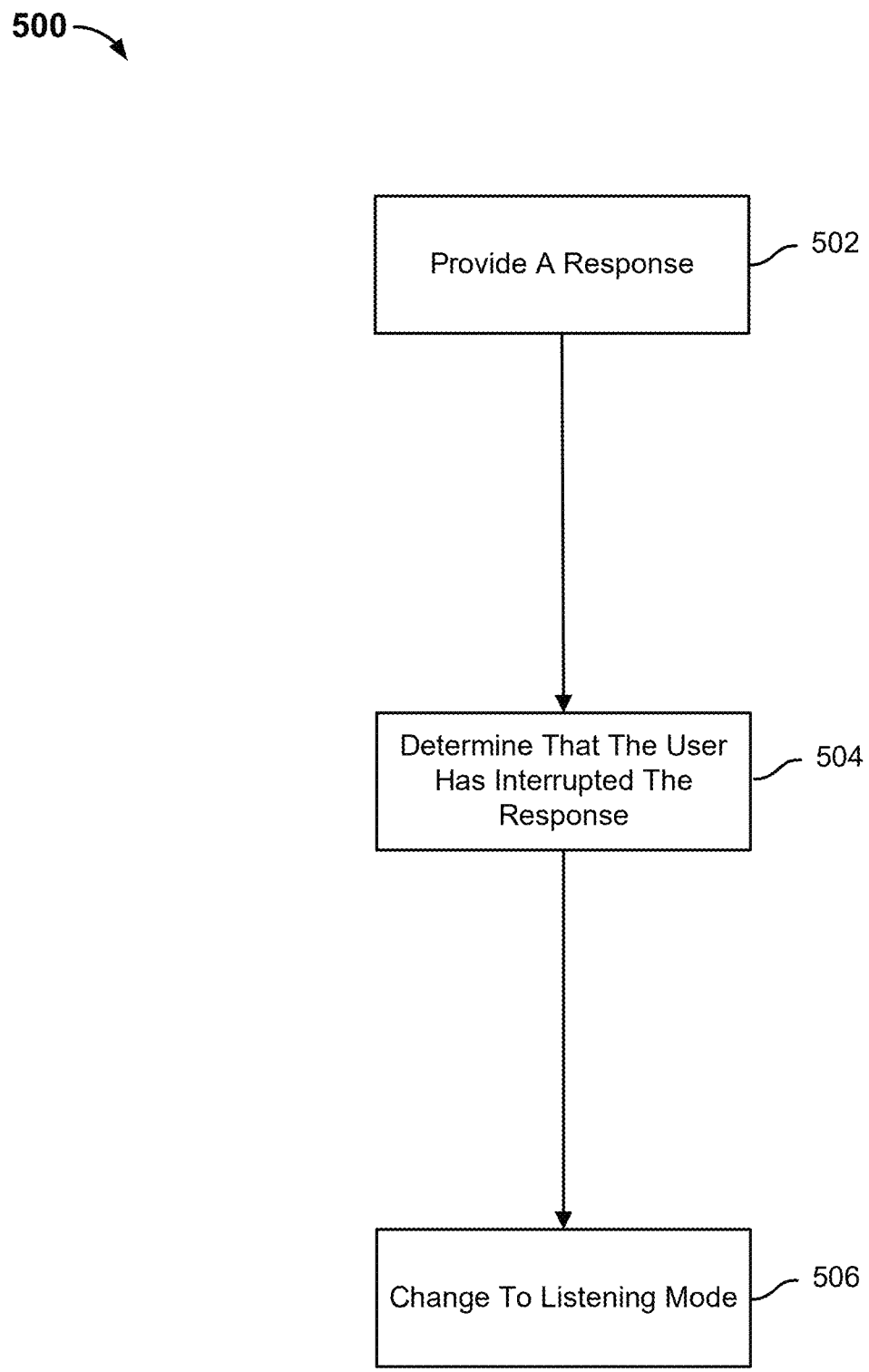
FIG. 5 is a flow diagram illustrating a process of understanding audio turns in accordance with some embodiments.

FIG. 5 is a flow diagram illustrating a process of understanding audio turns in accordance with some embodiments. In the example shown, process 500 may be implemented by an audio turn understanding system, such as audio turn understanding system 112. In some embodiments, process 500 is a continuation of process 200.

At 502, a response is provided. The response may be a large language model response. In some embodiments, the large language model response is provided as an audio response. In some embodiments, the large language model response is provided as a text response. In some embodiments, the large language model response is provided as a video response. In some embodiments, step 502 is step 210 of process 200.

At 504, it is determined that a user has interrupted the response. In some embodiments, the user has pressed a button or other input indicating that the user would like the audio turn understanding system to stop providing the response. In some embodiments, the user interrupts the response by speaking. In these embodiments, the user interrupt is detected by a microphone outputting an audio speaking corresponding to the one or more words or sounds outputted by the user.

At 506, a mode is changed from a speaking mode to a listening mode. Instead of continuing with providing the response, the audio turn understanding system changes from a speaking mode to the listening mode (e.g., step 506 proceeds to step 202 of process 200).

Figure 6:
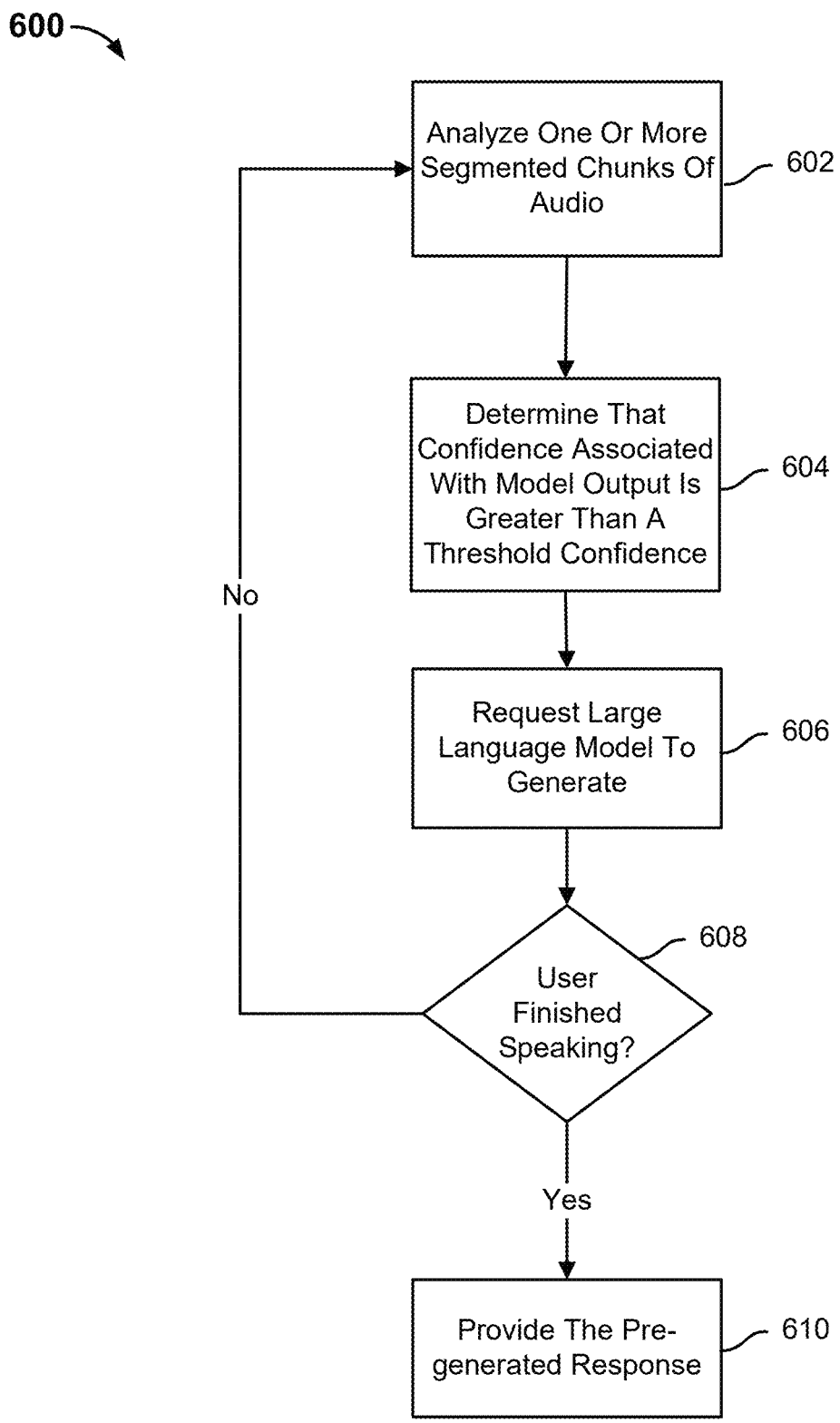
FIG. 6 is a flow diagram illustrating a process of pre-generating a response in accordance with some embodiments.

FIG. 6 is a flow diagram illustrating a process of pre-generating a response in accordance with some embodiments. In the example shown, process 600 may be implemented by an audio turn understanding system, such as audio turn understanding system 112.

At 602, one or more segmented chunks of audio are analyzed.

At 604, it is determined that a confidence associated with a model output is greater than a confidence threshold. An audio understanding model has outputted a confidence score that is greater than or equal to a confidence score threshold. This indicates that the user is likely finished their turn.

At 606, a request to generate a response based on a representation of what was said in the one or more chunks of audio is provided to a language model. In other embodiments, the audio understanding model waits a buffer period (e.g., 400 ms) before providing the representation of what was said in the one or more chunks of audio to the large language model. However, to improve the user experience in interacting with the AI system, the audio turn understanding system may pre-emptively request the large language model to generate the response even though the user may not be finished with their turn in the conversation. This reduces latency in providing a response when the user is actually finished with their turn. As a result, this may cause the conversation to feels as natural as a human-to-human conversation.

At 608, it is determined whether the user is finished speaking. The user is determined to be finished speaking after the audio understanding model outputs a confidence score that is greater than or equal to a confidence score threshold and a buffer period has passed. In response to a determination that the user is finished speaking, process 600 proceeds to 610. In response to a determination that the user is not finished speaking, process 600 returns to 602. As the system continues to request the large language model to generate a response, the large language model generates a response based on what has been cumulative said by the user in their turn, not merely what was said since the system previously requested the large language model to generate a response.

At 610, the pre-generated response received from the large language model is provided. In some embodiments, the pre-generated response is provided as an audio response. In some embodiments, the pre-generated response is provided as a text response. In some embodiments, the pre-generated response is provided as a video response.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   segmenting a real-time audio stream associated with a user into one or more chunks of audio, wherein segmenting the real-time audio stream associated with the user into one or more chunks of audio includes:

analyzing the real-time audio stream; and
determining whether a silent portion associated with the real-time audio stream is greater than or equal to a silent threshold;
in response to determining that the silent portion associated with the real-time audio stream is greater than or equal to the silent threshold, providing the one or more segmented chunks of audio to an audio understanding model, wherein the audio understanding model is trained using diarized data;
transcribing, by the audio understanding model, words included in the one or more segmented chunks of audio into written text;
determining, by the audio understanding model that the user is finished with their turn in a conversation including by using the written text and the diarized data that was used to train the audio understanding model to determine that the user has finished their turn in the conversation;
in response to determining that the user is finished with their turn in the conversation, waiting a buffer period;
in response to the buffer period lapsing, providing the written text to a large language model;
receiving a response from the large language model; and
providing the response to the user.

2. The method of claim 1, further comprising:
receiving the real-time audio stream associated with the user.

3. The method of claim 1, wherein in response to determining that silent portion associated with the real-time audio stream is greater than or equal to the silent threshold, extracting a chunk of audio from the real-time audio stream.

4. The method of claim 3, further comprising providing the extracted chunk of audio to the audio understanding model.

5. The method of claim 1, wherein the audio understanding model generates a representation of what was said in the one or more segmented chunks of audio.

6. The method of claim 5, wherein the representation of what was said in the one or more segmented chunks of audio is the written text.

7. The method of claim 5, wherein the representation of what was said in the one or more segmented chunks of audio is an audio embedding.

8. The method of claim 5, wherein the audio understanding model annotates the representation of what was said in the one or more segmented chunks of audio.

9. The method of claim 5, wherein the audio understanding model outputs a confidence score indicating whether the user has finished with their turn in the conversation.

10. The method of claim 9, wherein the audio understanding model determines that the user is finished with their turn in the conversation in response to the confidence score being greater than or equal to a confidence threshold.

11. The method of claim 1, wherein the large language model generates the response based on the written text.

12. The method of claim 1, further comprising determining that the user has interrupted a completion of providing the response.

13. The method of claim 12, further comprising:
changing to a listening mode and receiving a second real-time audio stream associated with the user.

14. The method of claim 1, wherein the audio understanding model is a machine learning model.

15. The method of claim 14, wherein the machine learning model is a neural network.

16. The method of claim 15, wherein the neural network is a supervised neural network, an unsupervised neural network, or a semi-supervised neural network.

17. The method of claim 1, further comprising:
providing a representation of what was said in the one or more segmented chunks of audio to the large language model; and
requesting the large language model to pre-generate the response before determining that the user is finished with their turn in the conversation.

18. The method of 17, wherein the provided response is the pre-generated response generated by the large language model.

19. A system, comprising:
a processor configured to:
segment a real-time audio stream associated with a user into one or more chunks of audio, wherein to segment the real-time audio stream associated with the user into one or more chunks of audio, the processor is configured to:
analyze the real-time audio stream; and
determine whether a silent portion associated with the real-time audio stream is greater than or equal to a silent threshold;
in response to determining that the silent portion associated with the real-time audio stream is greater than or equal to the silent threshold, provide the one or more segmented chunks of audio to an audio understanding model, wherein the audio understanding model is trained using diarized data;
transcribe, by the audio understanding model, words included in the one or more segmented chunks of audio into written text;
determine, by the audio understanding model that the user is finished with their turn in a conversation including by using the written text and the diarized data that was used to train the audio understanding model to determine that the user has finished their turn in the conversation;
in response to determining that the user is finished with their turn in the conversation, wait a buffer period;
in response to the buffer period lapsing, provide the written text to a large language model;
receive a response from the large language model; and
provide the response to the user; and
a memory coupled to the processor and configured to provide the processor with instructions.

20. A computer program product embodied in a non-transitory computer readable medium and comprising computer instructions for:
segmenting a real-time audio stream associated with one or more chunks of audio, wherein segmenting the real-time audio stream associated with the user into one or more chunks of audio includes:
analyzing the real-time audio stream; and
determining whether a silent portion associated with the real-time audio stream is greater than or equal to a silent threshold;
in response to determining that the silent portion associated with the real-time audio stream is greater than or equal to the silent threshold, providing the one or more segmented chunks of audio to an audio understanding model, wherein the audio understanding model is trained using diarized data;
transcribing, by the audio understanding model, words included in the one or more segmented chunks of audio into written text;

determining, by the audio understanding model that the user is finished with their turn in a conversation including by using the written text and the diarized data that was used to train the audio understanding model to determine that the user has finished their turn in the conversation;

in response to determining that the user is finished with their turn in the conversation, waiting a buffer period;

in response to the buffer period lapsing, providing the written text to a large language model;

receiving a response from the large language model; and providing the response to the user.

\* \* \* \* \*